Oct. 21, 1941.	J. S. STOKES	2,259,866
METHOD OF MAKING CONTAINERS
Filed June 3, 1939	4 Sheets-Sheet 2

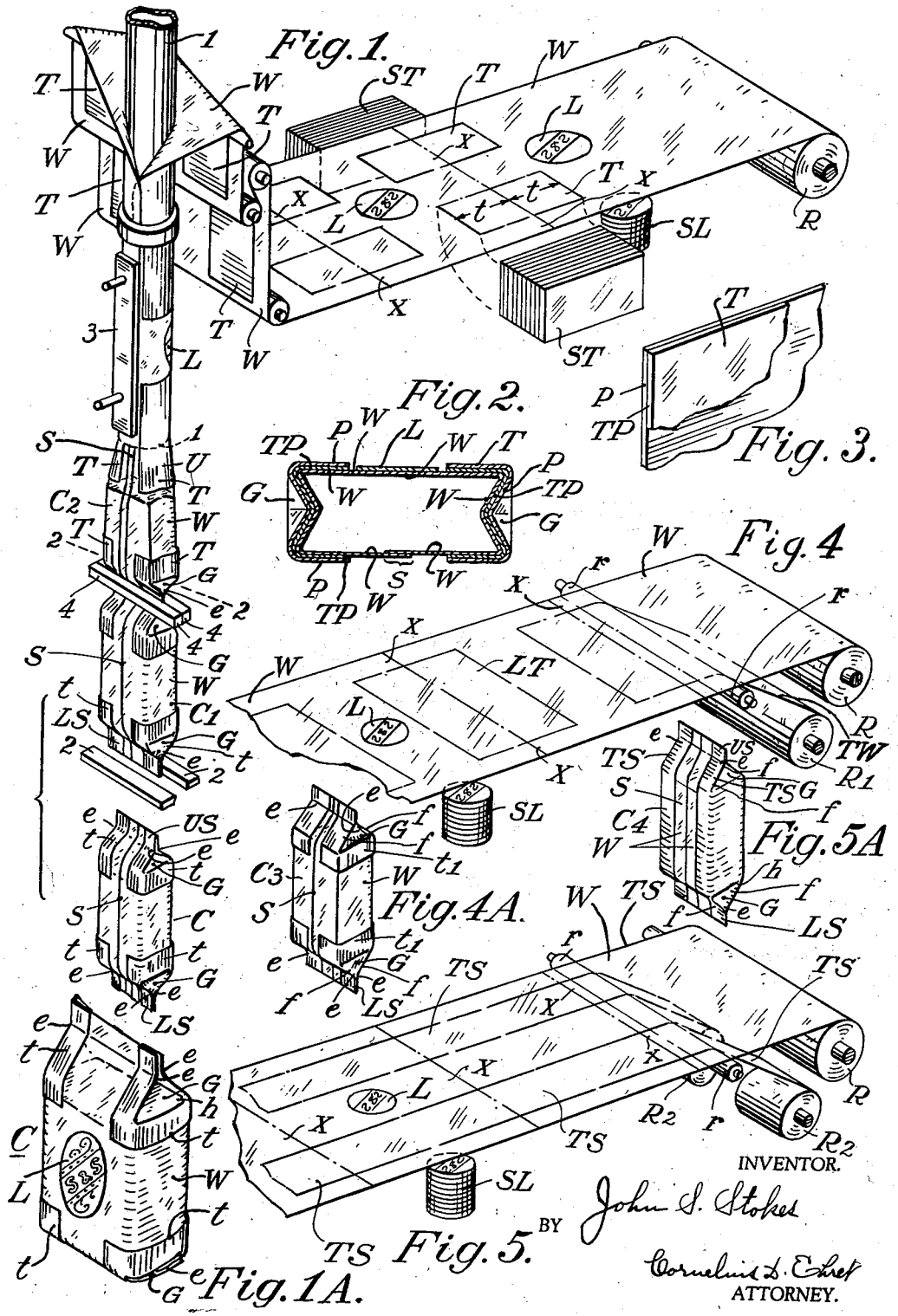

INVENTOR.
John S. Stokes
BY Cornelius L. Ehret
ATTORNEY.

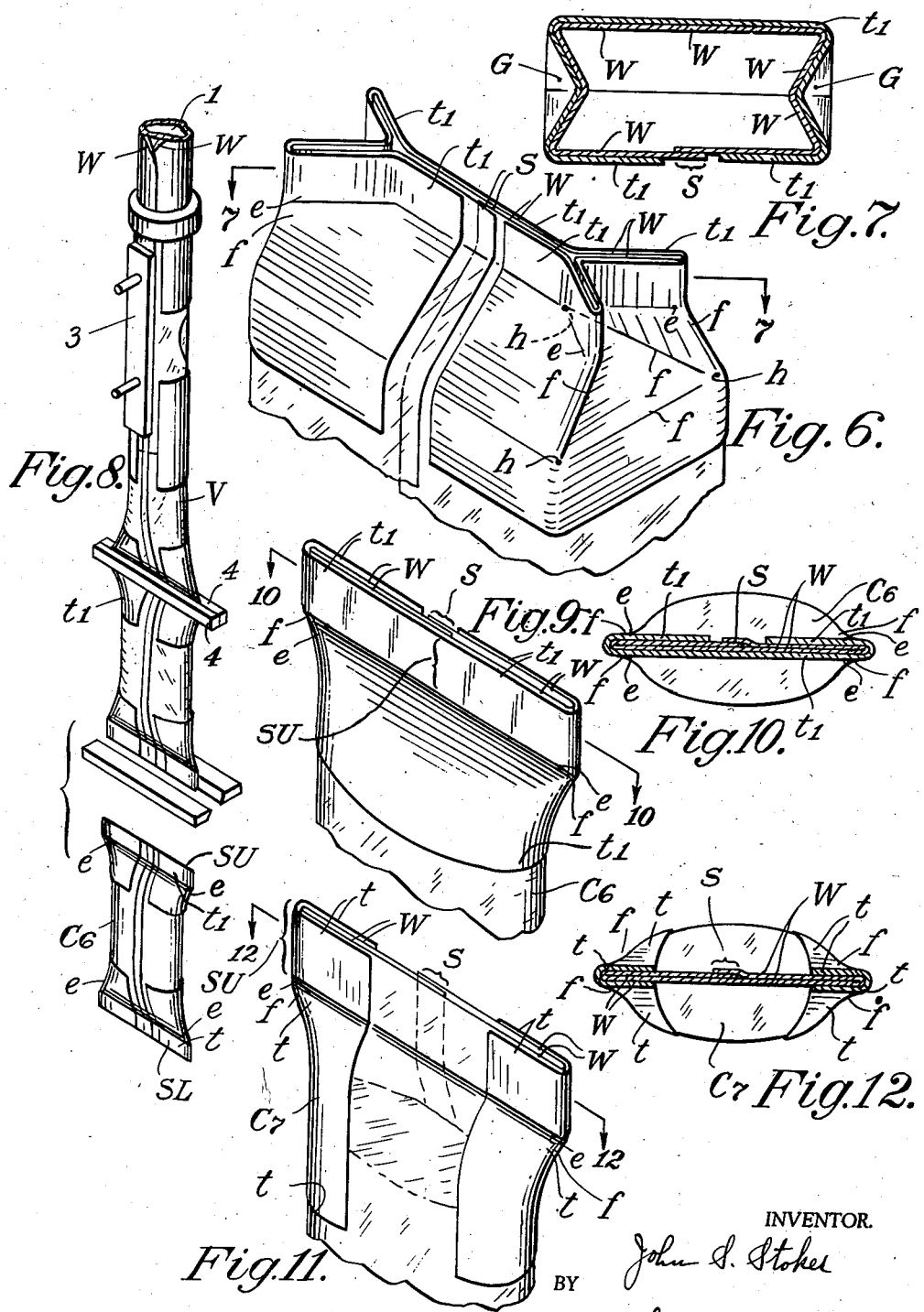

Oct. 21, 1941.   J. S. STOKES   2,259,866
METHOD OF MAKING CONTAINERS
Filed June 3, 1939   4 Sheets-Sheet 4
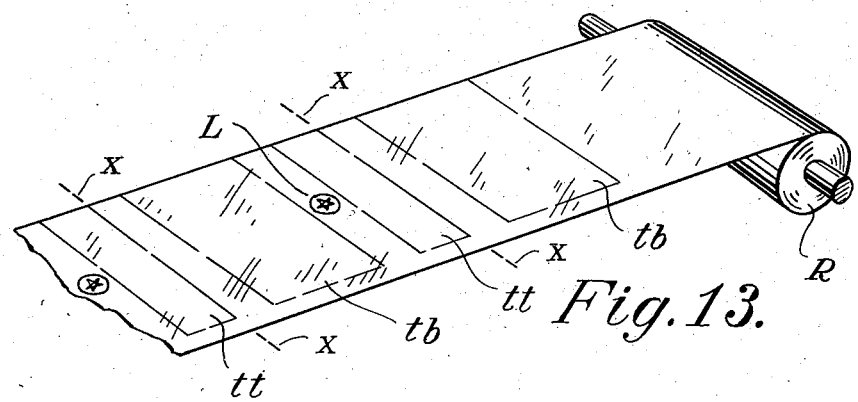
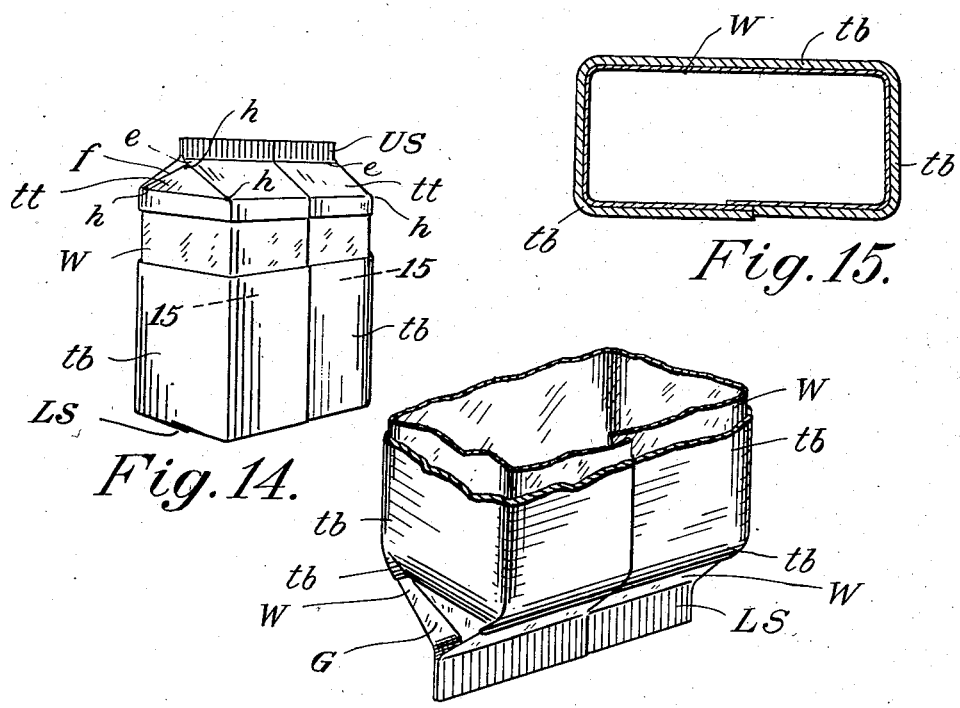
INVENTOR.
John S. Stokes
Cornelius D. Ehret
ATTORNEY.

Patented Oct. 21, 1941

2,259,866

UNITED STATES PATENT OFFICE 2,259,866

METHOD OF MAKING CONTAINERS

John S. Stokes, Huntingdon Valley, Pa., assignor to Stokes and Smith Company, Summerdale, Pa., a corporation of Pennsylvania Application June 3, 1939, Serial No. 277,132

12 Claims. (Cl. 93—3)

My invention relates to methods of making containers of pliant material, particularly moisture-proof Cellophane, "Pliofilm" and like thermoplastic materials.

In accordance with one aspect of my invention, reenforcing strips or elements of paper, cloth or any other suitable sheet material are regionally applied to the web, from which the containers are made, to those areas thereof in which it is sharply bent during the seal or end-forming operations; preferably, the reenforcing strips or elements are applied to the web at a station intermediate a supply roll from which the web is drawn or fed and a tubular form about which it is shaped and its edges joined to form a tube subsequently transversely flattened, at intervals longitudinally thereof, by heated tools to form seals which define filled containers or packages.

In accordance with one modification of my invention, the reenforcing elements are so spaced longitudinally of the web and extend to such distance transversely of it that each of the ends of the containers made therefrom is substantially completely encircled by reenforcing material; in accordance with another modification of my invention, the reenforcing elements are so spaced transversely and longitudinally of the web that each of the four corners of the container is reenforced by an individual reenforcing element; in still another modification, reenforcing strips spaced from each other and from the edges of the web are continuously applied longitudinally of the web to provide reenforcement for all corners of the containers, and by the same elements or strips to provide for stiffening or reenforcement of opposite sides of the containers.

My invention further resides in the methods of making containers hereinafter described and claimed.

For an understanding of my invention and for illustration of various containers and methods of producing them, reference is to be had to the accompanying drawings, in which:

Fig. 1 in perspective illustrates formation of reenforced containers;

Fig. 1A is a perspective view on enlarged scale of one of the containers formed by the method of Fig. 1;

Fig. 2 is a plan view, in section and on enlarged scale, taken on line 2—2 of Fig. 1;

Fig. 3 is a fragmentary view, in perspective and on enlarged scale, of a reenforcing element;

Figure 4B:
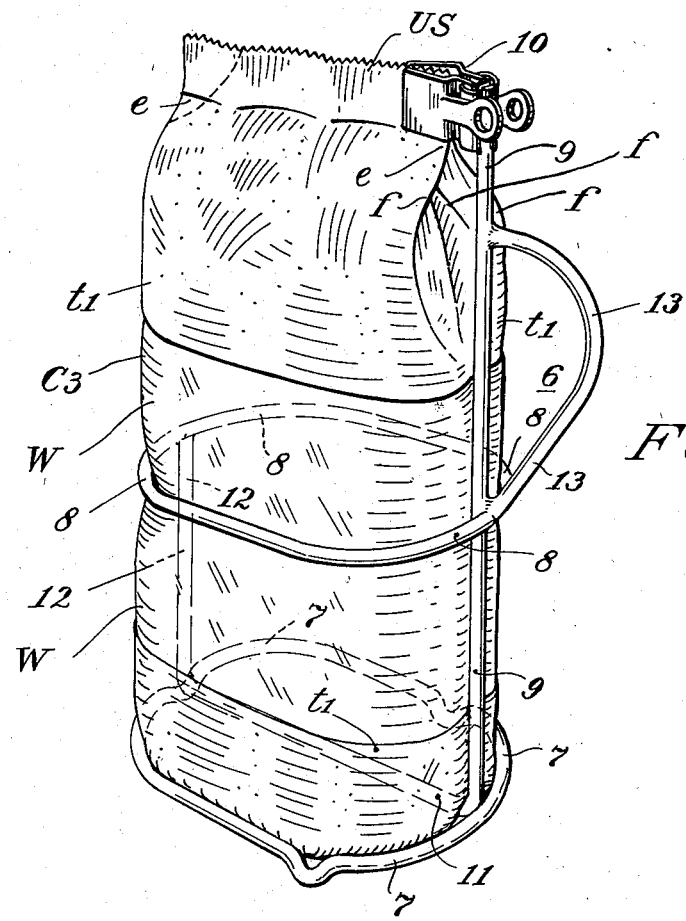

Fig. 4, in perspective, illustrates a modification of the method of Fig. 1;

Fig. 4A, in perspective, illustrates a package formed by the method of Fig. 4;

Fig. 4B, in perspective, illustrates the container of Fig. 4A in its carrier or holder;

Fig. 5, in perspective, illustrates another modification of the method of Fig. 1;

Fig. 5A is a perspective view of a container formed by the method of Fig. 5;

Fig. 6, in perspective, shows another type of container formed by the method of Fig. 1;

Fig. 7 is a plan view, in section, taken on line 7—7 of Fig. 6;

Fig. 8 illustrates a method of forming pillow-shaped packages;

Fig. 9 is a perspective view on enlarged scale of an end of a package made from the web of Fig. 4 by the method of Fig. 8;

Fig. 10 is a plan view taken on line 10—10 of Fig. 9;

Fig. 11, in perspective and on enlarged scale, illustrates the end of a package made from the web of Fig. 1 by the method of Fig. 8;

Fig. 12 is a plan view, in section, on line 12—12 of Fig. 11;

Fig. 13, in perspective, illustrates a further modification of Fig. 1;

Fig. 14 is a perspective view of a package made from the web shown in Fig. 13;

Fig. 15 is a plan view in section taken on line 15—15 of Fig. 14;

Fig. 16, in perspective, shows the lower end of the package of Fig. 14, before flattened.

In Figs. 2, 3, 6, 7, 10, 12 and 15, the thickness of the web and of the reenforcing material is exaggerated for clarity.

Referring to Fig. 1, the web W, preferably of Cellophane, "Pliofilm", or the like, coated with, impregnated with, or consisting of thermoplastic material, is fed from a supply roll R thereof to the tubular form I about which it is shaped, as hereinafter described, to form a tube U sealed transversely at intervals to form a succession of containers filled through form I and detached from the webbing by knives 2, 2 or equivalent, all as more fully described in Zwoyer U. S. Patent #1,986,422.

In accordance with the method shown in Fig. 1, preferably while the web W is a rest between successive feeding movements thereof toward form 1, there is attached to its surface, preferably that surface destined to be the outer side of each container, a pair of reenforcing elements T, preferably of paper, cloth, or similar or equivalent sheet material, either coated with adhesive for attachment to the web W, or coated or impregnated with a thermoplastic for attachment to the web by application of heat and pressure. As indicated in Fig. 3, each reenforcing element or tab T may comprise a sheet of paper P suitably attached to a sheet TP of thermoplastic material serving to attach tab T to web W.

In any event, each pair of elements T, T, as applied or attached to web W, are spaced from each other transversely of the web and from at least one of the longitudinal margins of the web; the distance between lines x, x, Fig. 1, not actually appearing on the web, corresponds with the length of the containers to be cut from the web; elements T, T, or the corresponding reenforcing members herein subsequently described, need not, however, be spaced from either edge of the web when the overlapping margins of the web are joined as in Figs. 8, 10, and 14 of Maxfield Patent #2,146,831 to extend outwardly from the tube formed from the web.

At the same station at which the reenforcing elements are applied and, in any event, preferably before the web is shaped about the form 1, there is attached to it, preferably on the face thereof destined to be the outside of a container, a series of labels L, usually of paper, having thereon printed descriptive or decorative matter, desirably appearing on the finished containers yet expensive to print directly upon the web W; alternatively, or in addition, the reenforcing elements T, T may bear thereon printing or decorative matter.

The web W, with the regional or locally applied reenforcing elements T and label L thereon, is shaped about the form 1 to bring the margins or edges of the web, free throughout of reenforcing material, into overlapping relation. The web margins so overlapped are joined, as by application of heat and pressure when the web is of, or coated or impregnated with, thermoplastic material, to form a seam S extending longitudinally of the tube U. Preferably heat and pressure are applied by platen 3, generally of the type described and claimed in copending Sonneborn et al. application Serial #259,748, which is moved into engagement with the overlapping margins while the web material is at rest, and is out of contact with the web during its feed.

The tube U is divided longitudinally into containers, by the heated tools 4, 4 which move toward each other to flatten the tube U between them below the open lower end of the tubular form 1 and so form, across the tube, an autogeneous seal section subsequently divided by knives 2, 2 or equivalent into a seal US closing the top of a filled container, such as C1, and a seal LS closing or forming the bottom of another container, such as C2. Thereafter, the tools 4, while clamping the tube U between them, move downwardly, to the position shown in Fig. 1, to extent substantially corresponding with the desired length of the successive containers; thereupon the tools 4, 4 separate sufficiently to clear the sides of container C2 and return to their original position. Particularly when the web W is of "Pliofilm," the heated seal sections should not be subjected to feeding tension; in such case, pulling the web over form 1 may be effected, as disclosed in aforesaid Sonneborn et al. application, by unheated clamping tools operating substantially concurrently with the tools 4, 4, but engaging the web at some distance above the heated tools 4, 4.

While the web W is at rest between the successive feeding movements of the tools 4, 4 or of the auxiliary feeding clamps, another pair of reenforcing elements T, T is applied, as above described, to the web material en route to the tubular form 1.

In accordance with the method of Fig. 1, prior to clamping of the tube U by the seal-forming tools 4, 4, the opposite sides of the tube are tucked in, generally as shown in Fig. 2, to form gussets G within the areas or limits of a pair of reenforcing elements T, T. Consequently, each transverse seal section formed by the tools 4, 4 includes at its ends both the tucked-in web material and the reenforcing material overlying it. The reenforcing material overlaps the seal section proper and adjacent areas of the containers, particularly the constrictions of the container at and adjacent the seal; and what is even more important, the reenforcing material strengthens the web material at the sharp bends produced during sealing and formation of the gusset fold, such as and especially those at h, most clearly shown in Fig. 6.

The knives 2, 2 or equivalent, when cutting across a transverse seal section substantially midway thereof, also cut across a pair of reenforcing elements T, T substantially along one of aforesaid lines x, so that each of a pair of reenforcing elements T, T is divided into reenforcements t for the lower end of one container C1 and another pair of reenforcements t for the upper end of the adjacent container C. Therefore, each filled container C, Fig. 1, as detached from the tube U, is closed at its upper end by a transverse seal US and, at its lower end by a similar transverse seal LS, with each of the four corners of each seal individually reenforced by an element t which is included within and strengthens the web within the gusset fold at that corner, which bridges the junction between an inner corner e of the seal (LS or US) and the body of the container, and which reenforces the constrictions of the container material near the inner corner e of the seal (LS or US). When the reenforcing elements T, T are themselves of thermoplastic material or are coated on both faces with adhesive, all adjacent layers or piles of webbing and reenforcing material at the ends of the transverse seals are bonded or joined to each other as distinguished from Fig. 6, hereinafter described.

Provision of the gusset folds G allows the bottoms of the containers, Fig. 1A, to be squared or flattened for display on shelves, or to suit a carrier or holder; or both ends of the containers may be squared for their packing or shipment. Preferably, as shown, the reenforcement elements t are of such dimensions that they embrace the corners of the containers so squared.

In accordance with the method of Fig. 4, for each pair of reenforcing elements T, T of Fig. 1, there is substituted a single long tab LT whose length measured transversely of the web is sufficient substantially to encircle a finished container, Fig. 4A.

The tabs LT may be fed from a stack thereof, or, as shown in Fig. 4, they may be cut in succession from web TW stored on roll R1. During feed of web W, the leading end of web TW is progressively drawn over idler roll r into engagement with the under face of web W, and is cut when the extent of web TW so fed corresponds with the desired width of an element LT as measured longitudinally of the web W. The attachment of the reenforcing material, as in other forms of my invention, may be effected by adhesive or by application of heat and pressure when the web TW is surfaced with or consists of a thermoplastic material. As in the method of Fig. 1, the distance between the successive lines $x$, $x$ of the reenforcing elements substantially corresponds with the desired length of a container.

The subsequent steps of shaping the webbing with the regionally applied reenforcing elements LT thereon about a form, such as form 1, Fig. 1, of joining the margins of the web to form a tube, of tucking in sides of the tube to form gussets, and of sealing the tube transversely at intervals longitudinally thereof to form containers, are generally like those described in connection with Fig. 1.

The resultant package, shown in Fig. 4A, is closed at its upper and lower ends by the transverse seals US and LS, respectively; at each end the package is approximately entirely encircled by a reenorcing element $t1$, of width substantially equal to one half of the width of the reenforcing element LT as applied to the web W. Each of the reenforcing elements $t1$ overlies the associated seal (US or LS) and constrictions of the package adjacent the seal, and in particular, overlies the constrictions $f$, $h$ in the container wall adjacent the inner corners $e$ of the seals and defining or within the gusset G.

With this form of package, like that shown in Figs. 1 and 1A, the portion of the package between its ends is free of reenforcing material, so leaving the contents of the package visible for inspection if web W be of transparent or translucent material, such as Cellophane or Pliofilm.

In this and all the other modifications herein described, the reenforcing elements may have color or colors different from the color of the web material W for decorative or other purposes, in addition to increasing the strength of the container at points or regions particularly susceptible to breakage.

In accordance with the method shown in Fig. 5, the reenforcing material is applied to the webbing W in the form of two strips TS, TS spaced from each other transversely of the web and spaced from the longitudinal edges of the web. The strips TS may be fed over idler roller $r$ from supply rolls R2, R2 thereof during each feeding movement of the web W and to extent corresponding with the length of a container.

The package or filled container resulting from subjecting the locally reenforced webbing so formed to the steps described in connection with Fig. 1, is shown in Fig. 5A; each package C4 is sealed at its upper and lower ends by the transverse seals US and LS, respectively, and each of two opposite sides of the package is covered by a reenforcing strip which, at its upper and lower ends, forms part of the corresponding ends of the transverse seals. The contents of package C4 are visible through the uncovered region of webbing W extending from top to bottom of the front and rear faces of the container between the reenforcing strips TS.

In Fig. 5A, as in each of the preceding modifications and those subsequently described, the reenforcing material overlies the constrictions $f$ in the container wall at and adjacent the inner corners $e$ of the upper-end lower seals US, LS; it additionally reenforces the web W at and within the gusset folds G, so preventing the container from breaking open along the creases or constrictions within the gusset fold.

Containers reenforced as herein described are suitable for packaging of a wide variety of materials, including liquids, such as milk, oil, or the like, and various powdered solids, such as sugar or flour; the filling is sealed against the atmosphere, and especially in the case of edibles, particularly in the case of milk, the filling is delivered in a container only once usable and reaches the user in optimum condition because the container has never before been used, and the filling is free of germs or other effects otherwise present from previous use of the container or from exposure of the filling to the atmosphere.

For handling or transport of the filled containers, there may be provided individual holders or carriers 6, generally of the type shown in Fig. 4B. The exemplary form of carrier shown is fabricated from wire, suitably joined, as by soldering or welding, to form a framework upon and/or within whose lower member or bottom 7 is supported the bottom of the container; upper ring 8 embraces and preferably laterally supports the container substantially midway thereof; and standard 9, attached to bottom 7 and ring 8, extends substantially the entire height of the bag. The clamp 10, detachably or permanently attached to the upper end of standard 9 of the carrier, is suited to grip and hold the upper seal US of the bag within the region of its hereinbefore described reenforcement. The cross member 11 of frame 6 extending from one side to the other of bottom ring 7 engages the bottom of the bag; member 11 is so oriented that when the bag is in proper position for clamping of its upper seal by clamp 10, the member 11 is substantially parallel with the lower seal rather than transverse thereof, in which latter case member 11 would not engage the reenforcing material. The short upright member 12 of the carrier 6 serves to maintain the proper spacing between the upper and the lower rings 8, 7.

The handle 13, also of wire, facilitates pouring of liquid from the container; during the pouring, the container is maintained extended by engagement of clamp 10 with one corner of the seal US whose other corner is torn or cut off to form a lip or spout for discharge of the liquid or other filling.

The carrier or holder 6 generically represents any holder or carrier for containers of the type described, especially when the filling is liquid which causes the container to accommodate itself and conform with form and construction of the holder; more particularly, in the example illustrated, the bottom of the container accommodates or conforms itself more or less snugly in contact with the bottom 7 and cross member 11; and the sides of the container conform with and somewhat bulge at and around the uprights 9 and 12 and the member 8.

When the reenforcing elements or strips of Figs. 1, 4 and 5 are coated only on their web-engaging side with adhesive or other bonding substance, all layers of the ends of the seals US and LS are not bonded together as in the modifications previously described; on the contrary, as shown in Fig. 6, the ends of the seals are forked or divided. However, as in the preceding modifications, the tabbing material overlies and reenforces all of the creases or constrictions $f$, $h$ in the web material necessary for the formation of the gusset folds and for formation of the seals.

Though particularly valuable for containers having gusset folds, my invention is not limited thereto and to advantage may be used in the manufacture of filled containers of the pillow or lozenge type, shown in Figs. 8 to 12.

To make containers of the type shown by C6, Figs. 8 and 9, the web W corresponds with that shown in Fig. 4; that is, to the web there are applied at intervals, corresponding with the length of container, reenforcing elements which extend substantially entirely across the width of the container. The edges of the web are joined generally as described in connection with Fig. 1, and the tube V so formed is transversely-sealed at intervals longitudinally thereof to form containers. However, unlike Fig. 1, the sides of the tube are not tucked in prior to flattening thereof by the heated clamping tools 4, 4; in consequence, gusset folds are not formed at the ends of the containers, Fig. 8. Each end of the container is substantially completely encircled by a reenforcing element $t1$, which overlies the constrictions $f$ of the container at and adjacent the inner corners $e$, $e$ of the associated seal SU or SL. As in all other modifications, the reenforcing material may terminate short of the longitudinal seam S. The relation of the tabbing elements $t1$ to the container are shown in Figs. 9 and 10; they may be of thermoplastic material, or of paper, cloth, or the like, coated with adhesive or impregnated with thermoplastic material; and they may be suitably colored and/or bear printing and/or descriptive or decorative matter.

The type of container or package shown in Figs. 11 and 12, of which it is characteristic that each of the corners of the pillow-shaped container is reenforced by an individual tab $t$, is made from a web such as shown in Fig. 1 by performing thereon the steps illustrated by Fig. 8 and described in connection therewith. As most clearly appears in Figs. 11 and 12, each of the tabs $t$ embraces one corner of the container C7, overlies the seal at that corner and also overlies the constrictions $f$ in the container wall at and adjacent the junction of the seal with the container body.

The filled container or package C8, shown in Fig. 14, is similar to that of Fig. 4A except the lower reenforcement $tb$ extends substantially higher on the package, for example, well over halfway or about two-thirds the distance from the bottom, and is of suitably stiff material so that when the package is in upright position, it has, because of such reenforcement $tb$, considerable stability and does not tend to collapse or fall over even when its contents are liquid.

For a substantial distance between the upper edge of reenforcement $tb$ and the lower edge of reenforcement $tt$, the web W, of which the container proper is made, is clear of reenforcing material, permitting inspection of the package contents when the web is of Cellophane, "Pliofilm," or like material, which, to greater or less extent, is transparent.

Either or both of the reenforcing elements $tt$, $tb$ may bear printing and/or decorative matter to serve as a label; in addition, a label L, having no reenforcing function, may be applied to web W, as herein previously described, to appear on the container in the gap $g$ between the reenforcing elements.

To make packages similar to C8, Fig. 14, by a method corresponding with that described in connection with Fig. 1, a series of pairs of reenforcing elements $tt$, $tb$ are applied to web W; preferably, the elements $tt$, $tb$ and labels L, as used, are applied to web W between the supply roll R and the form 1 (Fig. 1) or equivalent; each of them may, as shown in Fig. 13, extend to one edge of the web W and terminate short of the other edge to permit direct contact of the overlapping margins of the web, Fig. 15, without interposition therebetween of the reenforcing material. The longitudinal seam S formed by joinder of the overlapping margins is, therefore, strong and not unduly thickened. If desired, the elements $tt$, $tb$ may terminate short of both edges of the web, as illustrated in prior figures, or may, if a projecting seam is not objectionable, extend entirely across the web.

Preferably, the distance between the upper or right edge of each element $tt$, Fig. 13, and the lower or left edge of the next element $tb$, is such that the element $tb$ in the finished container overlies and reenforces the corners of the container, Fig. 14, yet terminates substantially short of the lower seal, Fig. 16, thus insuring a bottom for the container, Fig. 14, which is substantially flat over its entire area and so contributes to stability of the package or container when standing in upright position.

As in all other modifications herein described, the web W is preferably of Cellophane, "Pliofilm", or like material, at least whose surface is thermoplastic; the reenforcing elements are preferably of suitably stiff material, for example, metallized craft paper; label L, preferably of paper, is also either thermoplastically or adhesively attached to web W.

The reenforcing elements $tt$ and $tb$ reenforce the corners of the package, the constructions and bends $f$, $h$ in the web material adjacent and within the gusset folds; and, in addition, the reenforcing element $tb$, which substantially encircles the container for about two-thirds of its height, stiffens it against collapse. This container and all others of the square or intuck type herein shown are suited for use with the carrier of Fig. 4B.

What I claim is:

1. In the art of making containers, the method which comprises applying reenforcing elements to a web of pliant material at intervals of extents longitudinally of the web corresponding with the lengths of the containers, joining the edges of the web to form a tube, and flattening the tube sharply to bend the webbing at areas thereof reinforced by said elements to form transverse seal sections each having a sharp bend overlapped by one of said elements.

2. In the art of making containers, the method which comprises applying pairs of reenforcing elements to a web of pliant material at intervals of extents longitudinally of the web corresponding with the lengths of the containers, joining the edges of the web to form a tube, and flattening the tube to form transverse seal sections each of whose ends is embraced by an element of one of said pairs.

3. In the art of making containers, the method which comprises applying at intervals along a web reenforcing elements each extending substantially across the web, joining the edges of the web to form a tube with said elements forming bands spaced longitudinally thereof, and applying heat and pressure transversely of the tube to form transverse seals each overlapped by one of said bands.

4. In the art of making containers, the method which comprises applying to a web reenforcing elements spaced from each other transversely and longitudinally of the web, joining the edges of the web to form a tube, and applying heat and pressure transversely of the tube to form flattened seals each of whose ends is overlapped by one of said elements.

5. In the art of making containers, the method which comprises feeding a web toward a tubular form, at a station in advance of said form applying to said web at intervals along it, reenforcing elements each extending substantially across the web, shaping the web about said form and joining its edges to form a tube having bands, respectively formed by said elements, spaced longitudinally thereof, and applying heat and pressure to said tube to form seals each overlapped by one of said bands.

6. In the art of making containers, the method which comprises feeding a web toward a tubular form, at a station in advance of said form, applying to said web at intervals longitudinally thereof, pairs of reenforcing elements spaced transversely of the web, shaping the web about said web and joining its edges to form a tube, and applying heat and pressure to said tube to form seals each of whose ends is overlapped by one of said elements.

7. The method of making reenforced containers and filling them which comprises applying reenforcing elements at intervals longitudinally of a web, joining the edges of the web to form a tube, applying heat and pressure to the tube to form seals each including at least one sharp fold of which is overlapped by one of said elements, introducing filling into the tube between formation of successive seals, and cutting the tube transversely through said seals and said elements to form individual filled containers each reenforced by overlap at and adjacent said seals.

8. The method of making reenforced containers and filling them which comprises applying at intervals along a web reenforcing elements each extending substantially across the web, joining the edges of the web to form a tube with said elements forming bands spaced longitudinally thereof, applying heat and pressure intermediate the edges of said bands to form seals extending across the tube, introducing filling into the tube between formation of successive seals, and cutting the tube transversely through said seals and between said edges of said bands to form individual filled containers each reenforced at and adjacent said seals by overlap thereof by said bands.

9. The method of making reenforced containers and filling them which comprises applying at intervals along a web pairs of reenforcing elements spaced transversely of the web, joining the edges of the web to form a tube, applying heat and pressure to the tube to form seals each overlapped at its ends by one of said pairs of elements, introducing filling into the tube between formation of successive seals, and cutting the tube through said seals to form individual filled containers each of whose sealed corners is individually reenforced.

10. In the art of making reenforced containers, the method which comprises intermittently feeding a web toward a tubular form, between successive feeding movements of the web applying reenforcing elements thereto at intervals longitudinally thereof, shaping the web about said form and joining its edges to form a tube, and beyond said form applying heat and pressure transversely of the tube at areas reinforced by said elements to form seal sections each overlapped by at least one of said elements.

11. In the art of making containers, the method which comprises applying reenforcing elements intermediate the edges of a web in spaced relation to each other longitudinally of and transversely of the web, joining said edges to each other to form a tube, and applying heat and pressure transversely of the tube to form seal sections spaced longitudinally of the tube and each overlapped by at least one of said elements.

12. In the art of making containers, the method which comprises applying reenforcing elements at intervals longitudinally of a web, joining the edges of the web to form a tube, transversely flattening the tube at intervals longitudinally thereof to fold the web within areas reinforced by said elements, and applying heat and pressure to the flattened portions of the tube to form seals.

JOHN S. STOKES.

CERTIFICATE OF CORRECTION.

Patent No. 2,259,866.  October 21, 1941.

JOHN S. STOKES.

It is hereby certified that error appears in the printed specification of the above numbered patent requiring correction as follows: Page 1, second column, line 32, strike out the comma after "14"; line 48, for "a" read --at--; page 2, first column, line 34, for the word "label" read --labels--; line 54-55, for "autogeneous" read --autogenous--; line 69, after "pulling" insert --of--; same page, second column, line 47, for "piles" read --plies--; page 3, first column, line 22, for "reenorcing" read --reenforcing--; line 23, for "one half" read --one-half--; page 4, second column, line 35, for the word "constructions" read --constrictions--; and that the said Letters Patent should be read with this correction therein that the same may conform to the record of the case in the Patent Office.

Signed and sealed this 25th day of November, A. D. 1941.

Henry Van Arsdale,
Acting Commissioner of Patents.

(Seal)